M. JELLINEK & J. F. DE TÓVÁROS.
SUSPENSION OF TROLLEY WIRES.
APPLICATION FILED APR. 26, 1910.
1,033,104.
Patented July 23, 1912.
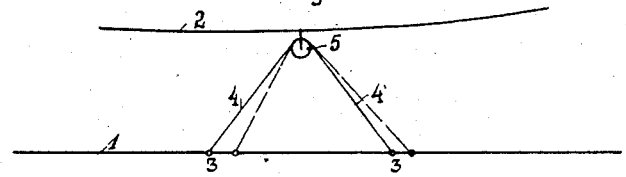
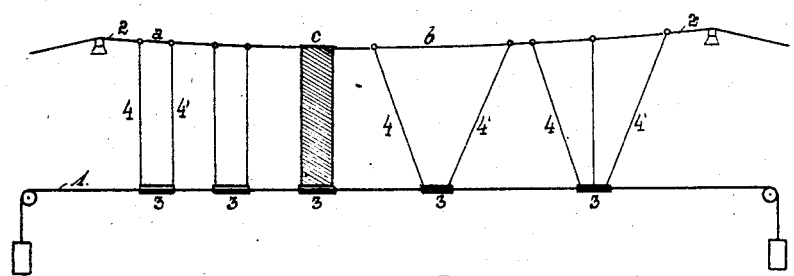
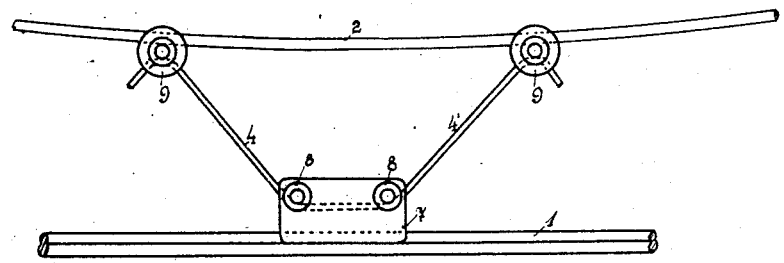
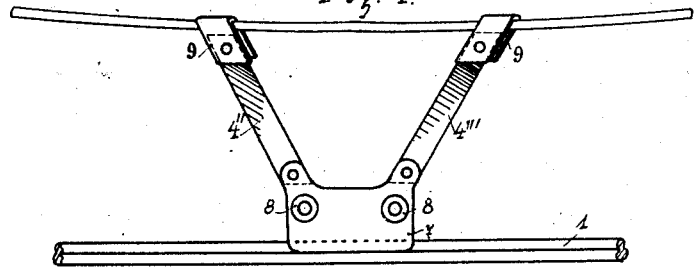
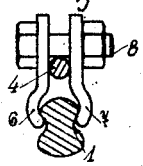
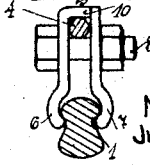
WITNESSES:
INVENTORS,
MARCELL JELLINEK and
JULES FISCHER de TÓVÁROS,
by H. Van Oldeneel
Attorney.

UNITED STATES PATENT OFFICE.

MARCELL JELLINEK AND JULES FISCHER DE TÓVÁROS, OF BUDAPEST, AUSTRIA-HUNGARY.

SUSPENSION OF TROLLEY-WIRES.

1,033,104.          Specification of Letters Patent.          Patented July 23, 1912.

Application filed April 26, 1910. Serial No. 557,833.

*To all whom it may concern:*

Be it known that we, MARCELL JELLINEK and JULES FISCHER DE TÓVÁROS, subjects of the King of Hungary, both residing at Budapest, in the Empire of Austria-Hungary, have invented a new and useful Improvement in or Relating to the Suspension of Trolley-Wires; and we do hereby declare the following to be a full, clear, and exact description of the same.

When trolley wires have been suspended from supporting or carrier wires, it has been found necessary, in order to equalize the longitudinal expansion or length variations, occurring as a result of variations in temperature, to provide weights or tension springs on the ends of the trolley sections, and to provide between the trolley wire and the carrier wire a connection capable of yielding in the longitudinal direction of the trolley wire. It has been proposed to effect a yielding connection of this kind by connecting the suspension wires 4, which connect the trolley wire 1 (see Figure 1) with the carrier wire 2, to clamps 3 or the like on the trolley wire, the suspension wire 4, leading from the one trolley wire clamp 3 to the other, passing over a roller 5 attached to the carrier wire 2. In the event of a longitudinal displacement of the trolley wire, the suspension wire 4 is supposed to assume the new position indicated in dotted lines, by the wire 4 moving over the roller 5, which, however, could take place only by using comparatively expensive twisted cables, which are not durable, as plain wires of the required strength would prove to be too stiff for this purpose, while at the same time all parts and their fitting would have to be very exact. Moreover, the suspension wire would thereby undergo a lengthening, since the increase in length of the one branch (in Fig. 1 the right hand one) is greater than the shortening of the other branch (left hand one in Fig. 1) so that simultaneously with a longitudinal displacement of the attaching points 3, 3 a variation in the height would take place.

According to the present invention the arrangement is made in such a manner that the trolley wire holders or supports or the like are so connected with the carrier wire by means of suspension wires, bands or the like, in at least two points which are as remote from each other as possible, that while insuring their horizontal position, any longitudinal displacement thereof is prevented as much as possible, the trolley wire holders or supports loosely embracing, surrounding or supporting the trolley wire, thereby enabling its longitudinal displacement therein or thereon.

Fig. 1 illustrates a known method of suspending the trolley wire; Fig. 2, several methods according to the present invention, for holding the trolley supports in fixed horizontal position; Figs. 3 and 5, a preferred method of suspensions; Fig. 4, a suspension in which bands are employed, instead of wires, and Fig. 6, a detail of a clamp for holding the trolley wire and the supporting wire.

The improved arrangement is diagrammatically shown in Fig. 2 of the drawing. The supports 3, 3 embrace or support the trolley wire 1 loosely, so as to enable its easy longitudinal displacement within the holders while preventing it from dropping out or disengaging therefrom. The holders, however, are so firmly connected to the carrier wire 2 as to be prevented from moving in longitudinal direction. To this end the holders may be connected to the carrier wire, as shown at —a— by means of two parallel suspension wires 4, 4', or as shown at —b—, by means of two diverging suspension wires 4, 4'. Instead of two wires, an appropriately wider band can be used, as indicated at —c—, in Fig. 2. The preferable mode of attachment is shown in Figs. 3 and 5. According to Fig. 5, the trolley wire 1 has the usual cross section, and is clamped, in a known manner, at the suspension points between two clamping jaws 6 and 7, the ends of which engage with the lateral grooves in the wire. Now, according to this invention, the suspension wire 4 passes between the jaws 6, 7 beneath the tie bolts or screws 8, 8 serving for the securing together of the clamping jaws, that is to say between the bolts and the trolley wire, and its thickness and the shape of the clamping jaws are so chosen that on tightening the bolts 8, only the wire 4 is firmly clamped whereas the trolley wire 1 is held loosely by the jaws and can be easily displaced therein in longitudinal direction.

According to Fig. 6 the clamp jaw 6 is provided with a rib 10 and the suspension wire 4 passes between the rib 10 and the bolts 8.

For the attachment of the two ends 9, 9 of the suspension wire, any known securing means, such as for instance clamping disks compressed by means of a bolt, may be used.

With this mode of carrying out the invention, the fitting or mounting of the whole system can be effected in a ready and simple manner.

According to Fig. 4 the clamp is suspended by means of strips 4″, 4‴ to the carrier wire, said strips being attached to eyes of the clamp.

What we claim is:—

1. In a catenary trolley wire suspension system, a messenger cable, wire clamps suspended from said messenger cable, means to assure a horizontal position and to prevent longitudinal displacement of said wire clamps, a grooved trolley wire, said clamps permitting longitudinal displacement of the trolley wire in the wire clamps, and means for maintaining the trolley wire at a substantially constant tension.

2. In a catenary trolley wire suspension system, a messenger cable, wire clamps, hangers suspending said wire clamps on the messenger cable and attached at two longitudinally distant points of the wire clamp and diverging from each other upwardly, a grooved trolley wire, said clamps permitting longitudinal displacement of the trolley wire in the wire clamps, and means for maintaining the trolley wire at a substantially constant tension.

3. In a catenary trolley wire suspension, a messenger cable, a grooved trolley wire, a wire clamp composed of two jaws loosely holding said trolley wire, a hanger wire secured at both of its ends to said messenger cable and clamped at its middle between the jaws of said wire clamp.

In testimony whereof, we have signed names to this specification in the presence of two subscribing witnesses.

MARCELL JELLINEK.
JULES FISCHER DE TÓVÁROS.

Witnesses:
HUGH KEMENY,
CHARLES SCHUSTER.

---

Copies of this patent may be obtained for five cents each, by addressing the "Commissioner of Patents, Washington, D. C."